US011655647B2

(12) United States Patent
Speak (10) Patent No.: US 11,655,647 B2
(45) Date of Patent: May 23, 2023

(54) REMOVABLE SKIMMER BASKET HANDLE

(71) Applicant: Brent Speak, Alpharetta, GA (US)

(72) Inventor: Brent Speak, Alpharetta, GA (US)

( * ) Notice: Subject to any disclaimer, the term of this patent is extended or adjusted under 35 U.S.C. 154(b) by 304 days.

(21) Appl. No.: 17/147,761

(22) Filed: Jan. 13, 2021

(65) Prior Publication Data

US 2022/0220760 A1    Jul. 14, 2022

(51) Int. Cl.
*E04H 4/14* (2006.01)
*E04H 4/12* (2006.01)
*B01D 29/27* (2006.01)

(52) U.S. Cl.
CPC ............... *E04H 4/14* (2013.01); *B01D 29/27* (2013.01); *E04H 4/1272* (2013.01)

(58) Field of Classification Search
CPC .......... B25B 13/48; B25B 13/481; B25J 1/04; E04H 4/14; E04H 4/1272; B01D 29/27
See application file for complete search history.

(56) References Cited

U.S. PATENT DOCUMENTS

| | | | |
|---|---|---|---|
| 6,176,157 B1 * | 1/2001 | Ure | B25B 13/48 81/176.1 |
| 6,592,756 B1 * | 7/2003 | Felix, Jr | E04H 4/14 210/477 |
| 8,168,065 B1 * | 5/2012 | Gavigan | C02F 1/76 210/167.11 |
| 8,636,899 B2 * | 1/2014 | Tesauro | E04H 4/14 4/290 |
| 8,864,986 B1 * | 10/2014 | Smith | E04H 4/1272 210/232 |
| 2009/0243318 A1 * | 10/2009 | Pratt | B65G 7/12 294/209 |
| 2011/0056940 A1 * | 3/2011 | Goffman | E04H 4/1272 220/212.5 |
| 2018/0250806 A1 * | 9/2018 | Gladue | B25G 1/10 |
| 2019/0032352 A1 * | 1/2019 | Gladue | E04H 4/14 |
| 2022/0119291 A1 * | 4/2022 | Murphy | C02F 1/76 |
| 2022/0126483 A1 * | 4/2022 | Freeman | B29C 33/0033 |

* cited by examiner

*Primary Examiner* — Joshua T Kennedy
(74) *Attorney, Agent, or Firm* — Brent Speak (57) ABSTRACT

The present invention relates to a Removable Skimmer Basket Handle which is ideal for people who wishes to use skimmer sock fabric in their skimmer baskets to collect ultra-fine particles and prevent them going into their pool filter. The removable handle allows this person the ability to remove the basket using the upper portion curved handle and twist the handle to separate the handle from the basket so the person can remove the fabric sock and replace with a new sock. The present invention also allows a skimmer basket lifting tool that enables a user to engage and remove a skimmer basket for cleaning without having to contact the debris accumulated within the basket.

4 Claims, 14 Drawing Sheets

REMOVABLE SKIMMER BASKET HANDLE

COPYRIGHT NOTICE

A portion of the disclosure of this parent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND

Field of the Invention

The present invention relates to apparatuses for improving the operation of pool skimmers, particularly those used in swimming pools, and methods of using the same.

Description of the Related Art here are various ways for cleaning and maintaining a pool, and often times multiple means for cleaning and maintaining a pool are used in conjunction with one another in order to prevent debris and particles from entering the pool filtration system. One of these cleaning means includes the use of a pool skimmer basket.

Skimmers are sort of like little buckets built into the side of the pool. They hold baskets, which performs a similar function to the handheld leaf skimmer, keeping leaves, twigs, and other debris from making their way into your filter.

Conventional pool skimmer baskets are small and sit at the bottom of the skimmer body unit. The size of a conventional skimmer basket limits the amount of material it can hold. If the skimmer basket is not heavy enough there can also be issues of the skimmer basket floating to the surface of the water and losing its effectiveness all together. Conventional skimmer baskets also have the issue of deterring air flow if the basket and/or skimmer body becomes clogged with debris, Without adequate air flow the pool filtration system and motor can become damaged. The place where the skimmer basket seats at the bottom of the skimmer body means the debris floats above the basket and thus may not be captured by the basket. Further, an individual attempting to empty a current skimmer basket must reach through the water and floating debris to grab hold of the basket handle and lift it towards the surface. While lifting the skimmer basket for emptying, the floating debris is dispersed back into the water within the skimmer body and many times back into the pool. When emptying the skimmer basket the individual must reach through the debris and many times scoop the captured debris out of the skimmer basket manually. This debris can include leaves and other natural waste as well as both living and dead bugs and small animals. When returning a current skimmer basket to the skimmer body the individual is required to manually return the basket back through the water and remaining debris to properly seat the basket. Many times, the remaining debris is caught underneath the skimmer basket and ultimately gets sucked further into the system causing clogs and damage to more expensive components of the pools filtration system.

There are multiple solutions that have been presented in prior art. For instance, For example, U.S. Pat. No. 8,202,416 teaches a diverter plate that replaces the existing weir 170 and consists of two parts that move into the skimmer 100. Although the diverter plate of the '416 patent claims to increase suction power, it does nothing to address the lack of capacity of the skimmer basket 160, the fact that a pool owner has to dip his or her hands into dirty water to remove the skimmer basket 160, or breakage of basket handles 166.

U.S. Pat. No. 5,830,350 teaches a vented tower that extends from the floor 161 of the skimmer basket 160 and seeks to address a particular problem associated with the skimmer basket 160, namely, the basket 160 being sucked to the skimmer well 198 by the pump 190. The '350 patent does nothing to address the small capacity of the skimmer basket 160, as the vents in the tower are air vents. The '350 patent also does not: address the flow rate of water into the basket 160.

Skimmer baskets with floating weirs have also been developed, as described in for example U.S. Pat. Nos. 6,716,342 and 4,325,150. These baskets are designed to prevent water from flowing back into the pool 110 from the skimmer 100 and are not designed to increase basket 160 capacity, make the basket 160 easier to grab, or to increase the velocity of water and debris entering the basket 160.

Finally, U.S. Pat. No. 4,737,279 ("the '279 patent") teaches an apparatus that sits on top of a skimmer basket and has two flow paths, one via a coupling for a suction hose and the other via a weir-gated enclosure carried by the basket closure. The '279 patent does not teach or suggest a system that has an inner and outer tube that are attached to a skimmer basket. The '279 patent also teaches that the proper position of the apparatus is the position in which the open weir gated side of the enclosure faces.

There are multiple advancements that have been presented in prior art. However, these solutions are limited and restricted to their conventional systems. As a result of intensive studies on the above problems, the present inventor has proposed a new advancement of skimmer basket with removable handle.

None of the previous inventions and patents, taken either singly or in combination, is seen to describe the instant invention as claimed. Hence, the inventor of the present invention proposes to resolve and surmount existent technical difficulties to eliminate the aforementioned shortcomings of prior art.

SUMMARY

In light of the disadvantages of the prior art, the following summary is provided to facilitate an understanding of some of the innovative features unique to the present invention and is not intended to be a full description. A full appreciation of the various aspects of the invention can be gained by taking the entire specification, claims, drawings, and abstract as a whole.

The primary desirable object of the present invention is to provide a novel and improved form of a skimmer basket with removable handle.

The most undesirable and time-consuming task in swimming pool maintenance is removing and cleaning the skimmer basket. The present invention significantly minimizes both the unpleasantness and the maintenance time associated with that task.

It is another objective of the invention to provide a handle capable of being attached to a skimmer basket where the handle has a column that positions a grip of the handle above the top of the skimmer basket and above the top of the water level when the handle is attached to the skimmer basket.

Another object of the present invention is to provide an improved skimmer basket handle capable of being attached to a skimmer well basket, wherein the improved skimmer basket handle has an extended column to permit a cleaning person to have easy access to the portion of the handle to be gripped when the skimmer basket is removed from a skimmer well.

It is further object of the present invention is to provide an assembly which is easy to use, hold and clean.

It is also the objective of the invention to provide a smart assembly, which provide ease of use and convenience to the user and provides multiple functionalities to the user.

It is also the objective of the invention to provide an efficient and easy assembly which is cost effective and convenient It is furthermore the objective of the invention to provide assembly which can be carved including but not limited to plastic, but can be made from metals or similar material by way of carving, machine cutting, injection and molding.

Thus, it is the objective to provide an advancement in removable skimmer basket handle assembly. Other aspects, advantages and novel features of the present invention will become apparent from the detailed description of the invention when considered in conjunction with the accompanying drawings.

This Summary is provided merely for purposes of summarizing some example embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

DETAILED DESCRIPTION

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Some prior art skimmer basket handles comprise small thin plastic straps or a small ridged side clip attached to the sides of the skimmer basket. The small thin plastic straps are generally not very strong and some are easily breakable. The small thin plastic straps and the small side clips rest inside of the skimmer basket below the water line and in the midst of the undesirable debris that has accumulated in the skimmer basket. In order to pick up such handles it is necessary to reach down into the inside of the skimmer basket and touch the undesirable debris in the skimmer basket.

Some other prior art skimmer basket handles comprise small metal or plastic wires that are connected to the rim of the skimmer basket. In the course of time such handles will become broken or detached or lost. This means that the cleaning person will be required to put his or her hand into the unpleasant debris that has accumulated in the skimmer basket.

In addition, many prior art skimmer baskets do not have a weight incorporated into the basket design. Skimmer baskets are usually made of lightweight material such as plastic. A skimmer basket that lacks a weight will float up through the debris in the skimmer well when the pool pump is not operating and not circulating water through the skimmer well. When the skimmer basket floats upwardly with respect to its seated position within the skimmer well, it will break the seal between the walls of the skimmer well and the rim of the skimmer basket. Then when the pool pump is turned on, there is a possibility that debris will lodge in the space between the rim of the skimmer basket and the walls of the skimmer well, thereby preventing the skimmer basket from properly seating itself in the skimmer well basket seat location.

Figure 1:
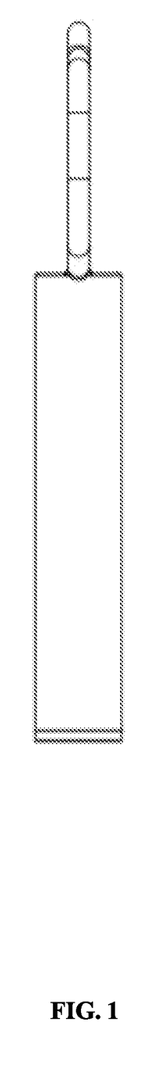
FIG. 1: is a Left elevational view of a removable skimmer basket handle.
Figure 2:
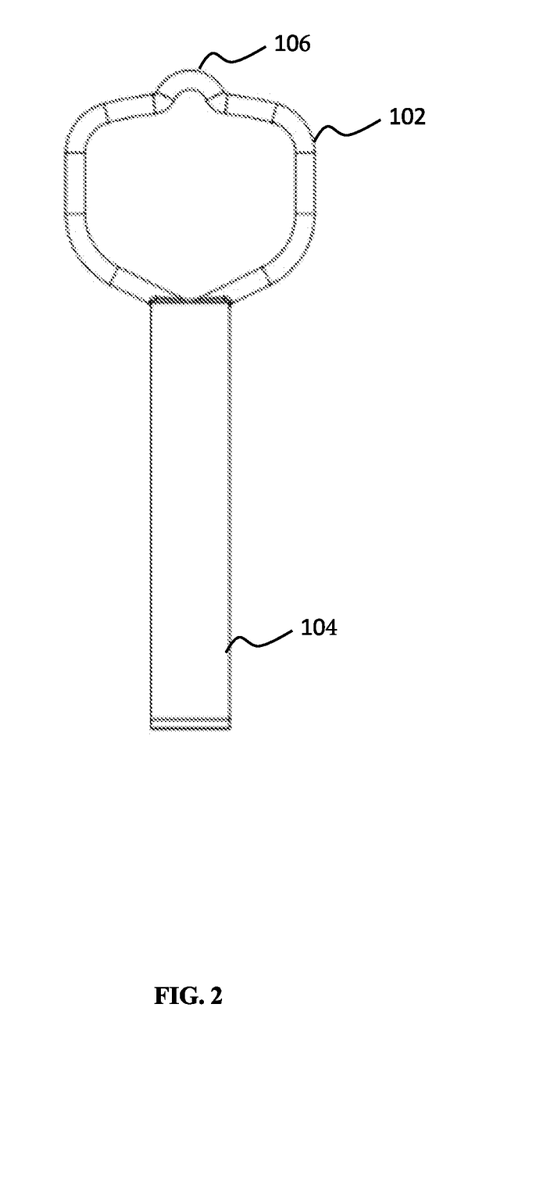
FIG. 2: is a Front elevation view of thereof.
Figure 3:
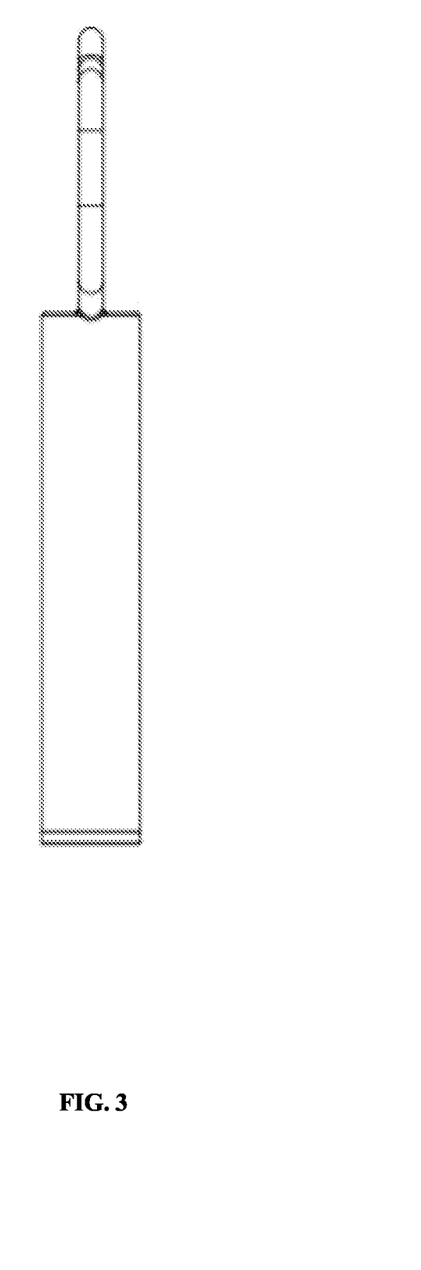
FIG. 3: is a Right elevation view thereof.
Figure 4:
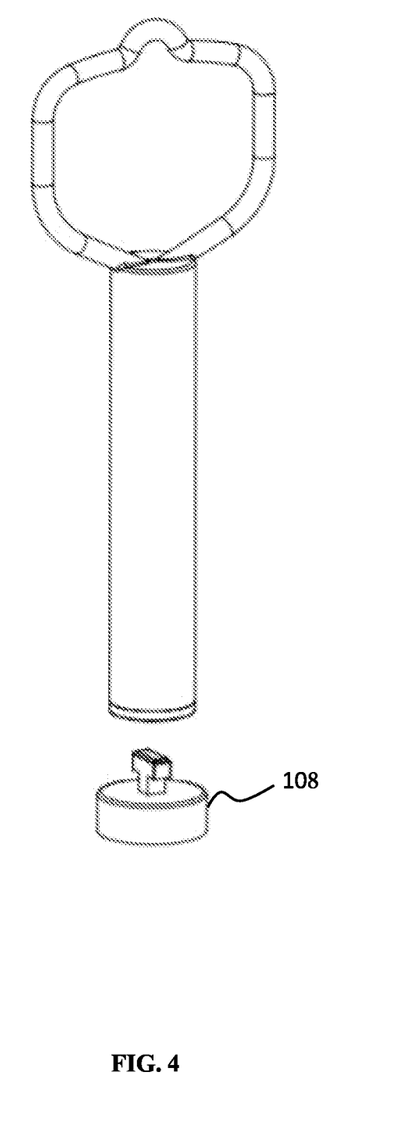
FIG. 4: is a Perspective elevation view thereof.
Figure 5:
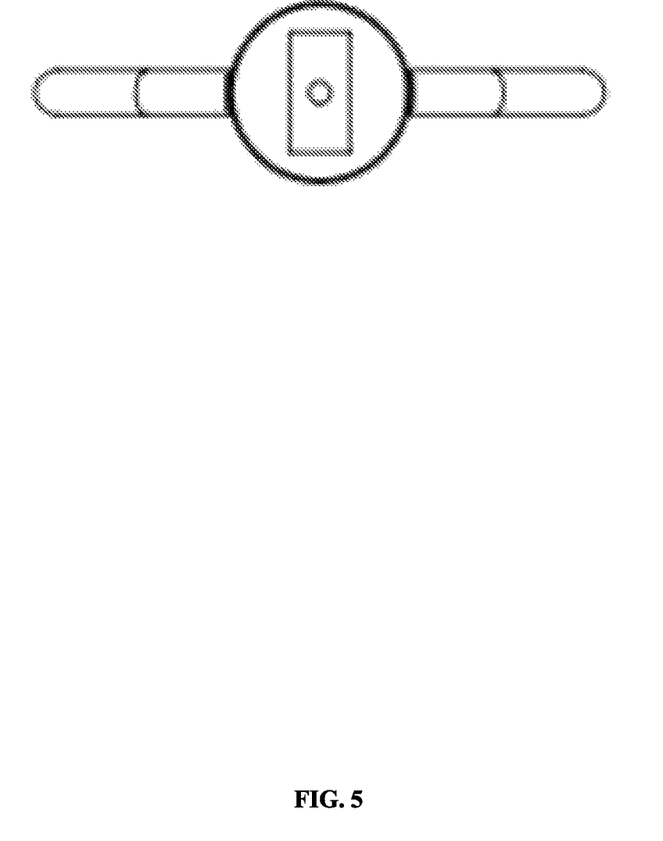
FIG. 5: is a Bottom elevation view thereof.
Figure 6:
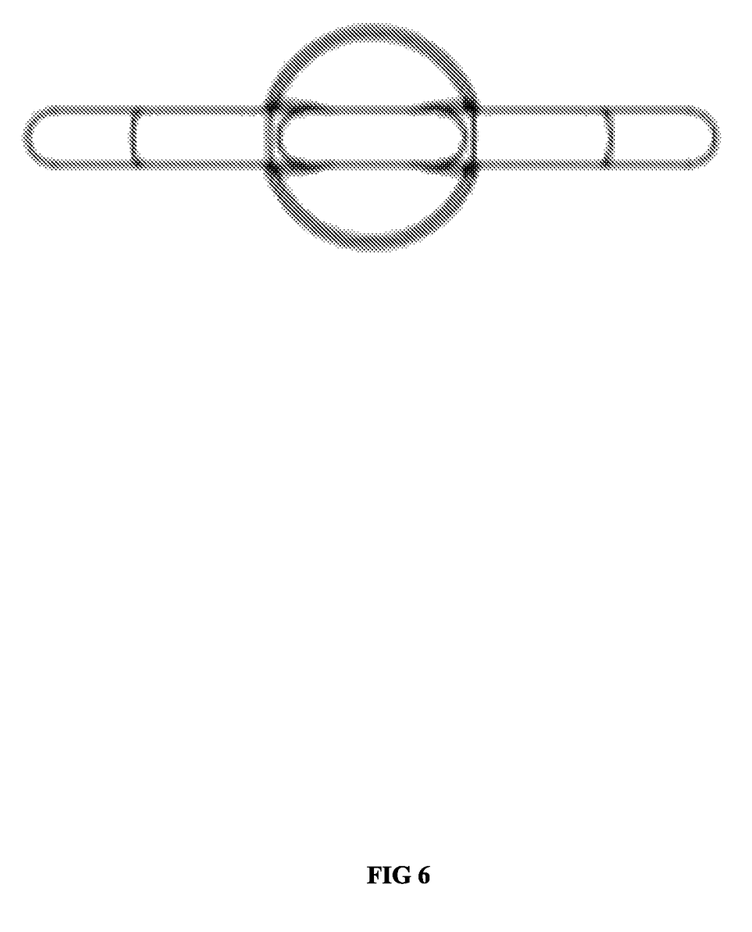
FIG. 6: is a top elevation view hereof.
Figure 7:
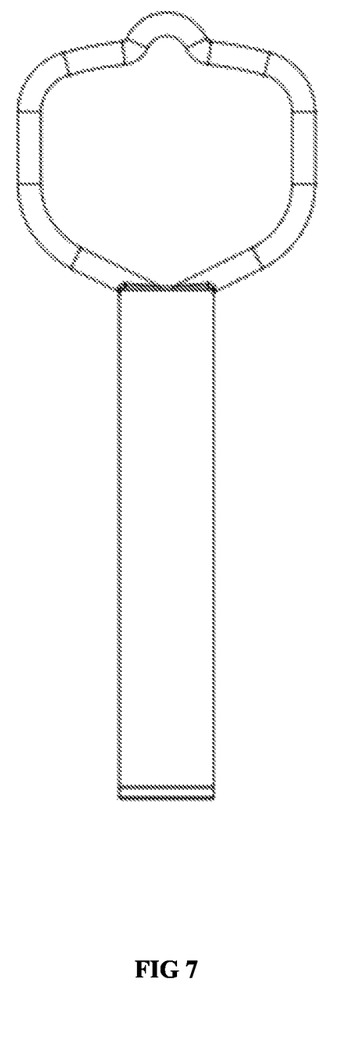
FIG. 7: is a Back view thereof, of removable skimmer basket handle.
Figure 8:
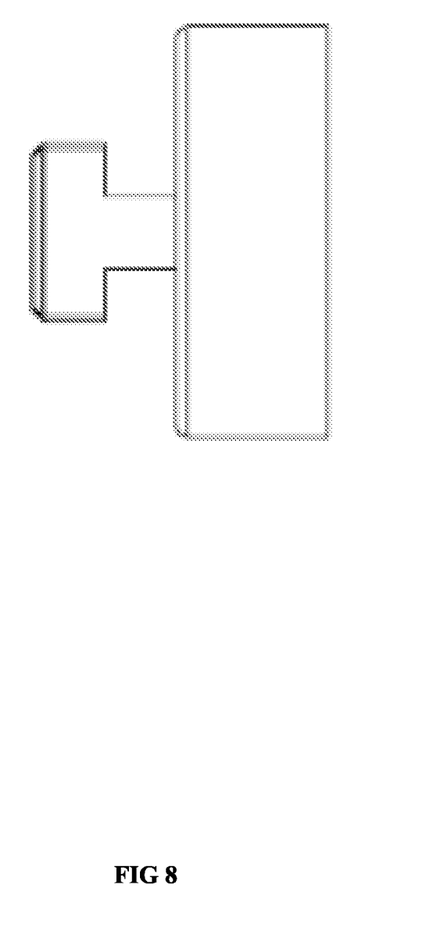
FIG. 8: is a Left elevational view of the base cap for the removable skimmer basket handle.
Figure 9:
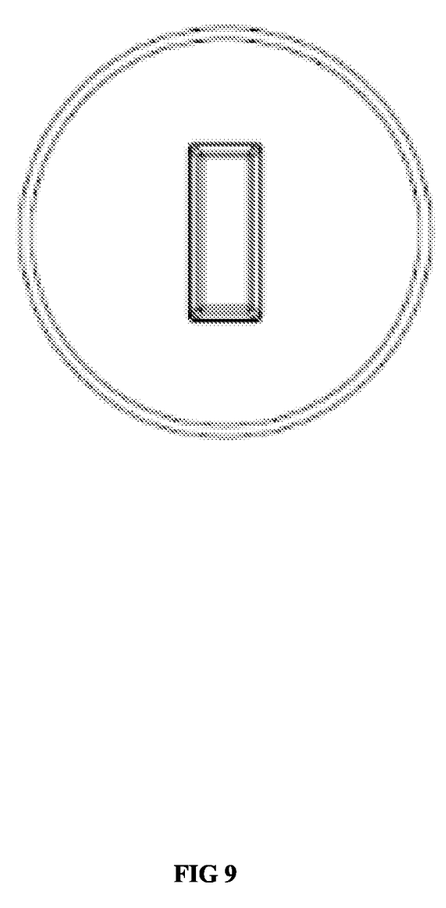
FIG. 9: is a Top elevation view thereof.
Figure 10:
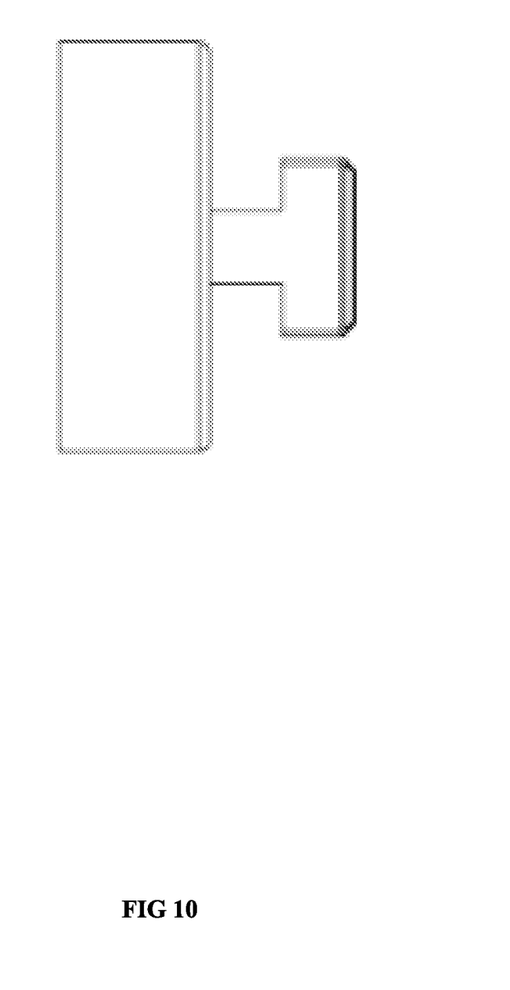
FIG. 10: is a Right elevation view thereof.
Figure 11:
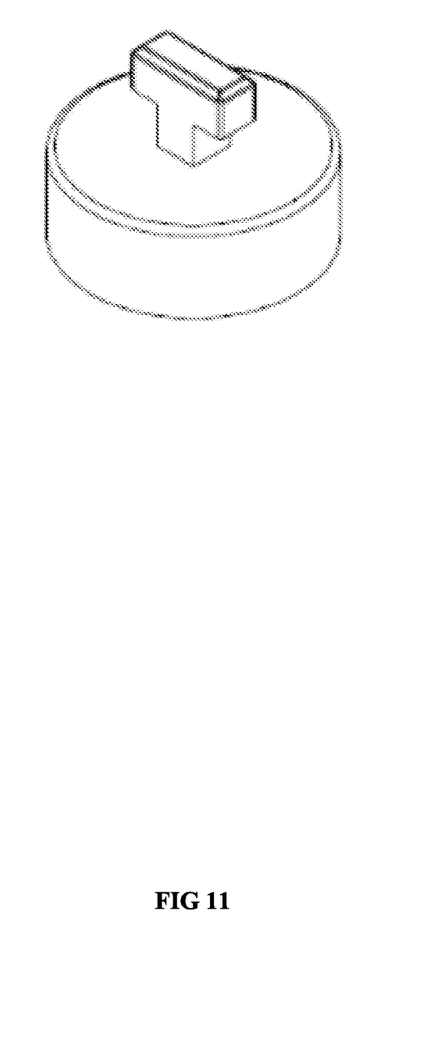
FIG. 11: is a Perspective elevation view thereof.
Figure 12:
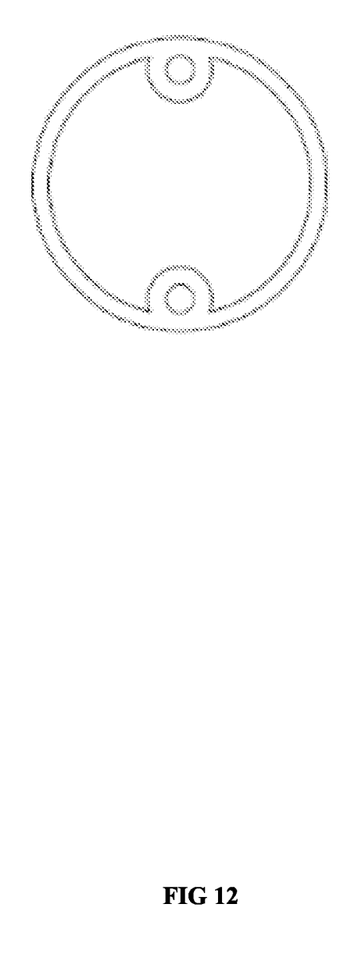
FIG. 12: is a Bottom elevation view thereof.
Figure 13:
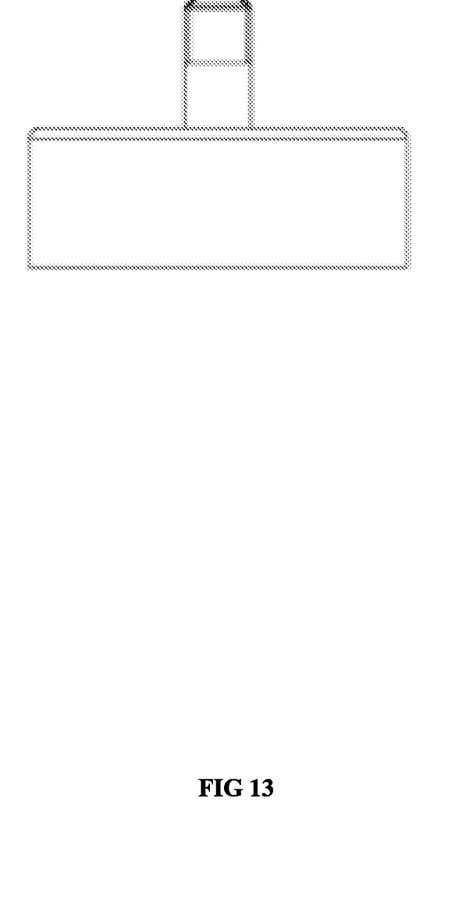
FIG. 13: is a front elevation view hereof.
Figure 14:
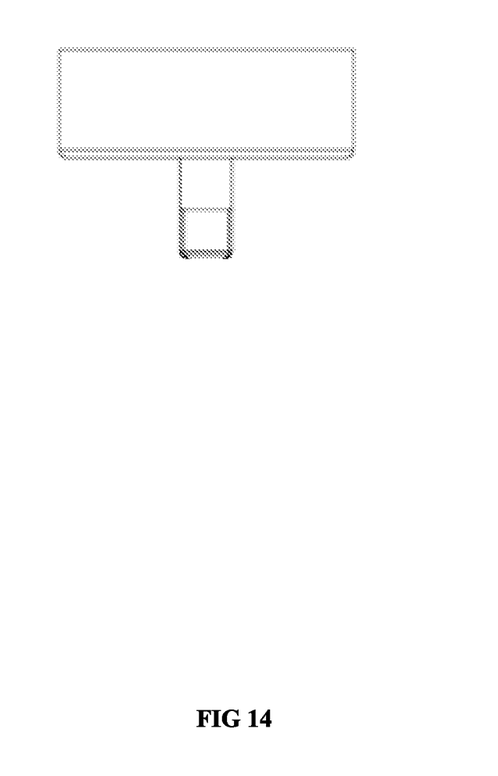
FIG. 14: is a Back view thereof, the base cap for the removable skimmer basket handle.

The present invention provides a removable skimmer basket handle comprising a grip 102 which is curved on top with a bump up peak 106 to be able to hook onto the handle to lift and remove the basket. It has a straight post 104 in the middle and the opposite end is flat with an internal slot large enough to receive a T bar base cap 108 that will be screwed/attached to the skimmer basket. The separate T bar base cap will allow a person to lock and unlock the handle to the skimmer basket with a ¼ turn twisting motion. The design is ideal for people who wish to use skimmer sock fabric in their skimmer baskets to collect ultra-fine particles and prevent them going into their pool filter.

The removable handle allows this person the ability to remove the basket using the upper portion curved handle and twist the handle to separate the handle from the basket so the person can remove the fabric sock and replace with a new sock. The person would then reattach the handle to the base pinching the sock between the handle and T bar with a ¼ turn. The T bar base is screwed into place on the inside of the skimmer basket with screws going through the underside of the skimmer basket, through the skimmer basket and into the T bar base screw holes.

While a specific embodiment has been shown and described, many variations are possible. With time, additional features may be employed. The particular shape or configuration of the platform or the interior configuration may be changed to suit the system or equipment with which it is used.

Having described the invention in detail, those skilled in the art will appreciate that modifications may be made to the invention without departing from its spirit. Therefore, it is not intended that the scope of the invention be limited to the specific embodiment illustrated and described. Rather, it is intended that the scope of this invention be determined by the appended claims and their equivalents.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A skimmer basket removal device comprising:
   a removable skimmer basket handle comprising a grip portion and an elongated post;
   said grip portion located at a first end of the elongated post and having a curved top and a bump up peak located on the curved top;
   a rectangular slot located at a second, opposite end of the elongated post;
   said post comprising a hollow portion at the second end communicating with said slot; and
   a separate base cap configured to be attached to a bottom of a skimmer basket;
   said base cap comprising a T shaped extension on a top thereof;
   wherein the handle is configured to engage said base cap such that the extension is received through the rectangular slot and into the hollow portion and the handle is turned ¼ turn;
   wherein said grip is configured to allow a user to hook the bump up peak through the grip to lift and remove the handle and basket when the handle is engaged to the base cap.

2. The skimmer basket removal device of claim 1, wherein the T bar base is configured to be screwed into place on an inside of a skimmer basket with screws going through the underside of the skimmer basket, through the skimmer basket and into T bar base screw holes.

3. The skimmer basket removal device of claim 1, wherein the rectangular slot of the handle and T shaped extension of the base cap are sized and shaped to be configured to capture a skimmer sock attached to the skimmer basket therebetween.

4. The skimmer basket removal device of claim 1, wherein the base cap is weighted to be configured to sink the skimmer basket.

* * * * *